United States Patent [19]

Bottomley

[11] Patent Number: 5,822,380
[45] Date of Patent: Oct. 13, 1998

[54] APPARATUS AND METHOD FOR JOINT CHANNEL ESTIMATION

[75] Inventor: Gregory Edward Bottomley, Cary, N.C.

[73] Assignee: Ericsson Inc., Research Triangle Park, N.C.

[21] Appl. No.: 689,584

[22] Filed: Aug. 12, 1996

[51] Int. Cl.$^6$ .................................. H04B 7/10; H04L 1/02
[52] U.S. Cl. .......................... 375/347; 375/254; 375/285; 455/303
[58] Field of Search ..................................... 375/259, 260, 375/267, 254, 284, 230, 229, 347, 348, 349, 346, 285, 325, 340, 224, 225, 227; 455/101, 504, 506, 63, 296, 65, 132, 303, 272, 273, 137

[56] References Cited

U.S. PATENT DOCUMENTS

| | | | |
|---|---|---|---|
| 3,879,664 | 4/1975 | Mossen | 325/303 |
| 4,271,525 | 6/1981 | Watanabe | 375/14 |
| 4,733,402 | 3/1988 | Mosen . | |
| 5,031,193 | 7/1991 | Atkinson et al. | 375/13 |
| 5,179,575 | 1/1993 | Pierce et al. | 375/14 |
| 5,203,027 | 4/1993 | Nounin et al. | 455/134 |
| 5,319,677 | 6/1994 | Kim | 375/100 |
| 5,347,541 | 9/1994 | Iltis et al. | 375/12 |
| 5,349,609 | 9/1994 | Tsujimoto | 375/100 |
| 5,465,271 | 11/1995 | Hladik et al. | 375/267 |
| 5,481,572 | 1/1996 | Skold et al. | 375/347 |
| 5,487,091 | 1/1996 | Jasper et al. | 375/347 |
| 5,553,102 | 9/1996 | Jasper et al. | 375/347 |
| 5,621,769 | 4/1997 | Wan et al. | 375/347 |
| 5,671,221 | 9/1997 | Yang | 370/320 |

OTHER PUBLICATIONS

Eckhard Papproth et al, Near resistant channel estimation for the DS–CDMA uplink, IEEE, pp. 758–762, Jan. 1995.

Paul Ho et al., Pilot symbol–assisted detection of CPM schemes operating in fast fading channels, IEEE Mar. 1993.

Sehier et al, performance evaluation of an oversampled rake receiver, IEEE May 1995.

G.E. Bottomley and K. Jamal, "Adaptive Arrays and MLSE Equalization," Proc. 45th IEEE Veh. Technol Conf., Chicago, IL Jul. 25–28, 1995.

K.J. Molnar and G. E. Bottomley, "D–AMPS Performance in PCS Bands With Array Processing," Proc. 46th IEEE Veh. Technol. Conf., Atlanta, GA, Apr. 28–May 1, 1996.

(List continued on next page.)

*Primary Examiner*—Jason Chan
*Assistant Examiner*—Jean B. Corrielus
*Attorney, Agent, or Firm*—David C. Hall

[57] ABSTRACT

An apparatus for estimating channel tap coefficients of a communication channel is provided which calculates channel tap coefficient estimates as a function of a received sample stream corresponding to the channel whose channel taps are being estimated and as a function of at least one other received sample stream corresponding to another receive channel. The apparatus receives digital sample streams from a plurality of receive channels and an impairment correlation matrix containing impairment correlation information among multiple receive channels. In one embodiment, the apparatus includes a precombiner which forms linear combinations of initial error samples from a first received sample stream and a second received sample stream to generate refined error samples for generating channel tap coefficient estimates. In one embodiment, an impairment correlation estimator receives the complex samples and the channel tap coefficients and generates an impairment correlation matrix for multiple receive channels. In one embodiment, a detector receives the complex samples, channel tap coefficients and the impairment correlation among multiple receive channels, and detects the transmitted information symbols. In one embodiment, the apparatus comprises a Kalman filter.

33 Claims, 8 Drawing Sheets

OTHER PUBLICATIONS

P. Ranta, A. Hottinen and Z.C. Honkasalo, "Co–Channel Interference Cancelling Receiver for TDMA Mobile Systems," Proc. IEEE Intl. Conf. Commun. (ICC '95), Seattle, WA, Jun. 18–22, 1995.

J. Thielke, W. Granzow and S. Frisch, "Interference Reduction Applied to Channel Estimation in CDMA Systems," Proc. 44th IEEE Veh. Technol.. Conf. (VTC '94), Stockhom, Jun. 8–10, 1994.

B. Anderson and J. Moore, Optimal Filtering, Prentice–Hall, 1979, Chapter 3.

J. Winters, "Signal Acquisition and Tracking with Adaptive Arrays in the Digital Mobile Radio System IS–54 with Flat Fading," IEEE Trans. Veh. Technol., vol. 42, pp. 377–384, Nov., 1993.

J. Proakis, Digital Communications, 2d Ed., McGraw–Hill, 1989, Chapter 6.

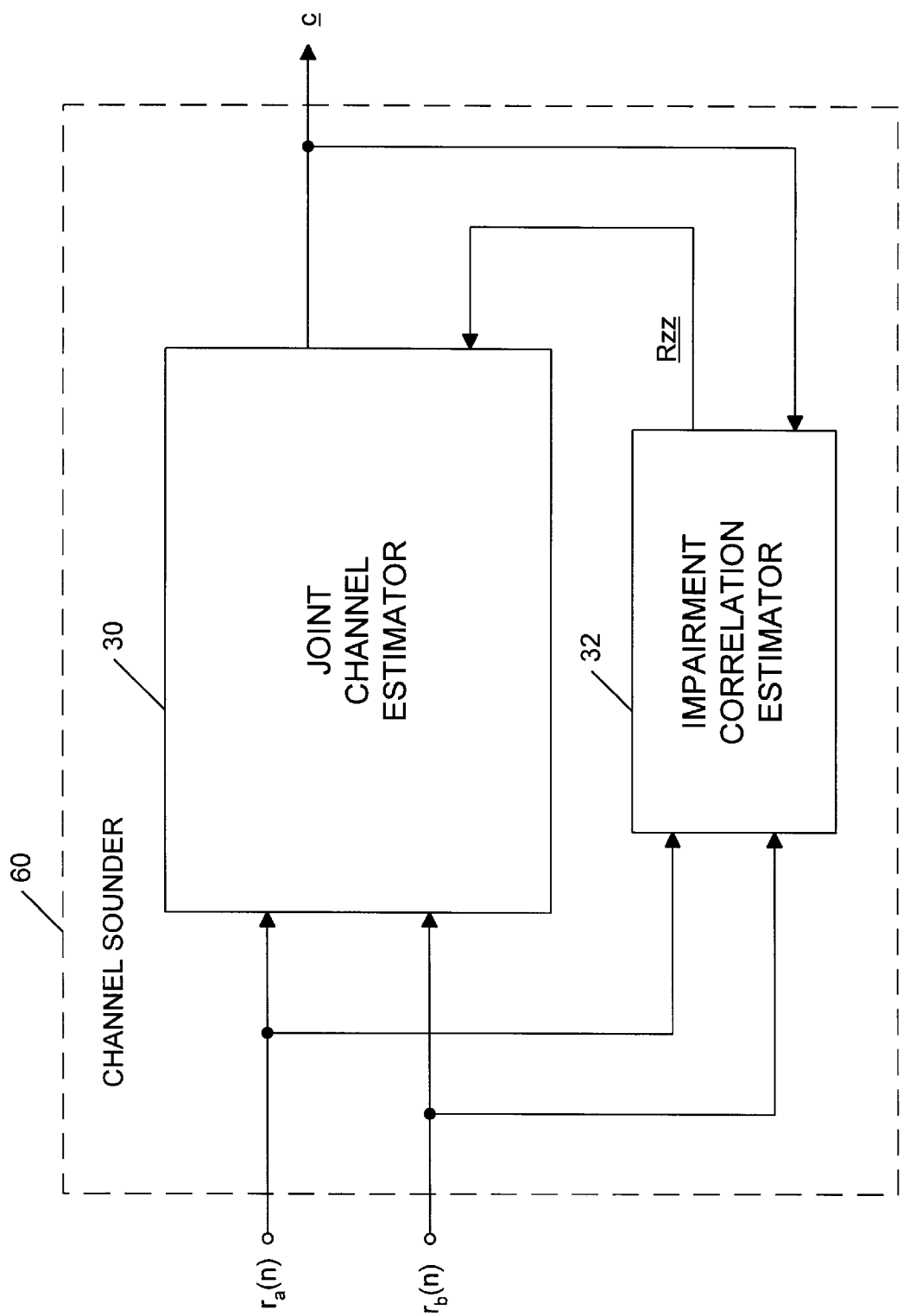

APPARATUS AND METHOD FOR JOINT CHANNEL ESTIMATION

BACKGROUND OF THE INVENTION

1. Field of Invention

The present invention relates generally to communication of digital signals and more specifically to an apparatus and a method for joint channel estimation of multiple receive channels in a digital communication system.

2. Description of Related Art

In a digital communication system, information symbols representing data are transmitted as a digital communications signal from one place to another through a transmission channel. The term "channel" is a used here in a general sense to refer to any medium through which a signal is transmitted. The channel may be a radio transmission environment, local area network, telephone transmission line, etc. The term "channel" may also refer to a predetermined frequency range in a radio environment. Regardless of the channel utilized, the received signal differs from the transmitted signal due to the effects of transmission through the channel. Such effects primarily include multipath fading, interference and thermal noise. Multipath fading is caused by the interaction of the signal with reflections or echoes of itself, and may result in time dispersion of the transmitted signal and large, highly localized fading of the signal known as Rayleigh fading. In a radio environment, interference is caused by the unwanted presence of other radio signals. These signals may be on the same channel as the desired signal (called co-channel interference) or on an adjacent channel (called adjacent channel interference). Thermal noise is present in all communication channels, and causes additional distortion of the transmitted signal.

Thus, the signal received at the receiver can be thought of as a composite signal consisting of the desired signal component plus an impairment component. The impairment component represents the total effect of interference and noise.

At the receiver, the received signal is processed to obtain a sequence or stream of digital samples, referred to herein as "received samples" or a "received sample stream." Using one type of receiver, the samples are complex numbers. For example, the signal may be filtered, amplified, and mixed down to baseband using in-phase and quadrature oscillators. After performing analog-to-digital (A/D) conversion and synchronization processing, a sequence of complex samples $r(n)$ is obtained. The complex samples $r(n)$ may be represented as the sum of a real component and an imaginary component as follows:

$$r(n)=I(n)+jQ(n) \quad [1]$$

where $I(n)$ represents the in-phase component of $r(n)$ and $Q(n)$ represents the quadrature component of $r(n)$.

The complex samples $r(n)$ can also be represented as the sum of the desired signal component and an impairment component as follows:

$$r(n)=s(n)+z(n) \quad [2]$$

where $s(n)$ is the desired signal component, $z(n)$ is the noise or impairment component, and n is the discrete time index.

The impairment component $z(n)$ may include thermal or environmental noise. It may also include interference from other signals, such as co-channel and adjacent channel interference in a cellular communications system. Often there are several interfering signals, with one being the strongest in power relative to the rest.

The receiver then applies some form of baseband signal processing to recover (or "detect") the information symbols. For example, using one form of detection, the desired signal component $s(n)$ may be modeled as the output of a filter having K complex channel tap coefficients to which the transmitted digital signal $b(n)$ is input as follows:

$$s(n)=c(0)b(n)+c(1)b(n-1)+\ldots+c(K-1)b(n-K+1) \quad [3a]$$

where channel tap coefficients $c(k)$ are complex values having both an amplitude and a phase. The channel tap coefficients may be organized as a vector c, in which case equation [3a] may be expressed as follows:

$$s(n)=c^T b(n) \quad [3b]$$

The channel tap coefficients are estimated using conventional channel tap estimation techniques and are used to calculate a detected digital symbol sequence $b_{det}(n)$. For example, if only $c(0)$ is non-zero (i.e. if only one channel tap is used to model the channel) and $b(n)$ is binary, then $b_{det}(n)$ can be calculated as follows:

$$b_{det}(n)=sgn[c(0)_{est}{}^*r(n)] \quad [4]$$

where $sgn[x]$ denotes taking the sign of x and superscript "*" denotes taking the complex conjugate. In the example shown, allowable values for $b_{det}(n)$ are +1 and −1. Thus, it is apparent that accurate detection of the transmitted digital signal $b(n)$ is dependent on having accurate estimates of the channel tap coefficients.

If multiple channel tap coefficient values are nonzero, some form of equalization, such as Maximum Likelihood Sequence Estimation (MLSE) equalization as described in Chapter 6 of J. Proakis, *Digital Communications*, 2d Ed., McGraw-Hill Book Co. 1989, may be performed.

Multiple receive channels may be used to receive the same transmitted signal to improve receiver performance. In a radio environment, multiple receive channels may be obtained by employing multiple receive antennas. If the impairment component includes interference, then conventional interference rejection techniques can be applied to improve the signal to noise ratio (SNR) of the received signal. Examples of interference rejection techniques include those described in *Signal Acquisition and Tracking with Adaptive Arrays in the Digital Mobile Radio System IS-54 with Flat Fading*, J. H. Winters, IEEE Trans. Veh. Technol., Vol. 42, pp. 377–384, November 1993. Such techniques allow for good detection performance in the presence of large interference.

Interference rejection using array processing techniques has the potential to produce large performance gains in a digital transmission system. However, for interference rejection to perform well, fairly accurate estimates of channel tap coefficients of each separate channel are required.

Known methods of estimating channel tap coefficients do not take interference into account, since they calculate the channel taps as a function only of the signal received over the channel under consideration. Thus, when the interference is large, accurately estimating each separate channel's channel tap coefficients is difficult.

Even if interference rejection is not performed by the detector, the effect of interference on channel tap coefficients is a concern, since the detector uses the estimated channel tap coefficients to detect the transmitted signal. Thus, there is a need to provide accurate channel tap coefficient estimates for multiple receive channels when interference is present.

SUMMARY OF THE INVENTION

It is, accordingly, an object of the present invention to provide an improved apparatus and method for estimating channel taps of multiple receive channels in a digital communication system.

It is a further object of the present invention to provide a baseband processor incorporating the improved apparatus and method for estimating channel taps of multiple receive channels in a digital communication system.

It is a further object of the present invention to provide a radio receiver incorporating the improved apparatus and method for estimating channel taps of multiple receive channels in a digital communication system.

It is a further object of the present invention to provide a channel sounding device incorporating the improved apparatus and method for estimating channel taps of multiple receive channels in a digital communication system.

It is a still further object of the present invention to provide an apparatus and method for estimating channel taps of multiple receive channels in a digital communication system employing a Kalman filter.

It is yet a further object of the present invention to provide an apparatus and method for estimating channel taps of multiple receive channels in a digital communication system containing a precombiner which forms linear combinations of initial error samples to generate refined error samples for generating channel tap coefficient estimates.

In accordance with the present invention, an apparatus for estimating channel tap coefficients of a communication channel is provided which calculates channel tap coefficient estimates as a function of a received sample stream corresponding to the channel whose channel taps are being estimated and as a function of at least one other received sample stream corresponding to another receive channel.

The apparatus receives digital sample streams from a plurality of receive channels and an impairment correlation matrix containing impairment correlation information among multiple receive channels. In one embodiment, the apparatus includes a precombiner which forms linear combinations of initial error samples from a first received sample stream and a second received sample stream to generate refined error samples for generating channel tap coefficient estimates.

In one embodiment, an impairment correlation estimator receives the complex samples and the channel tap coefficients and generates an impairment correlation matrix for multiple receive channels. In one embodiment, a detector receives the complex samples, channel tap coefficients and the impairment correlation among multiple receive channels, and detects the transmitted information symbols.

In one embodiment, the apparatus comprises a Kalman filter.

These and other objects of the invention, together with features and advantages thereof will become apparent from the following detailed specification when read with the accompanying drawings in which like reference numerals refer to like elements.

BRIEF DESCRIPTION OF THE DRAWINGS

FIG. 8 is a block diagram of a channel sounder according to an alternate embodiment of the present invention.

DETAILED DESCRIPTION OF THE PREFERRED EMBODIMENTS

Figure 1:
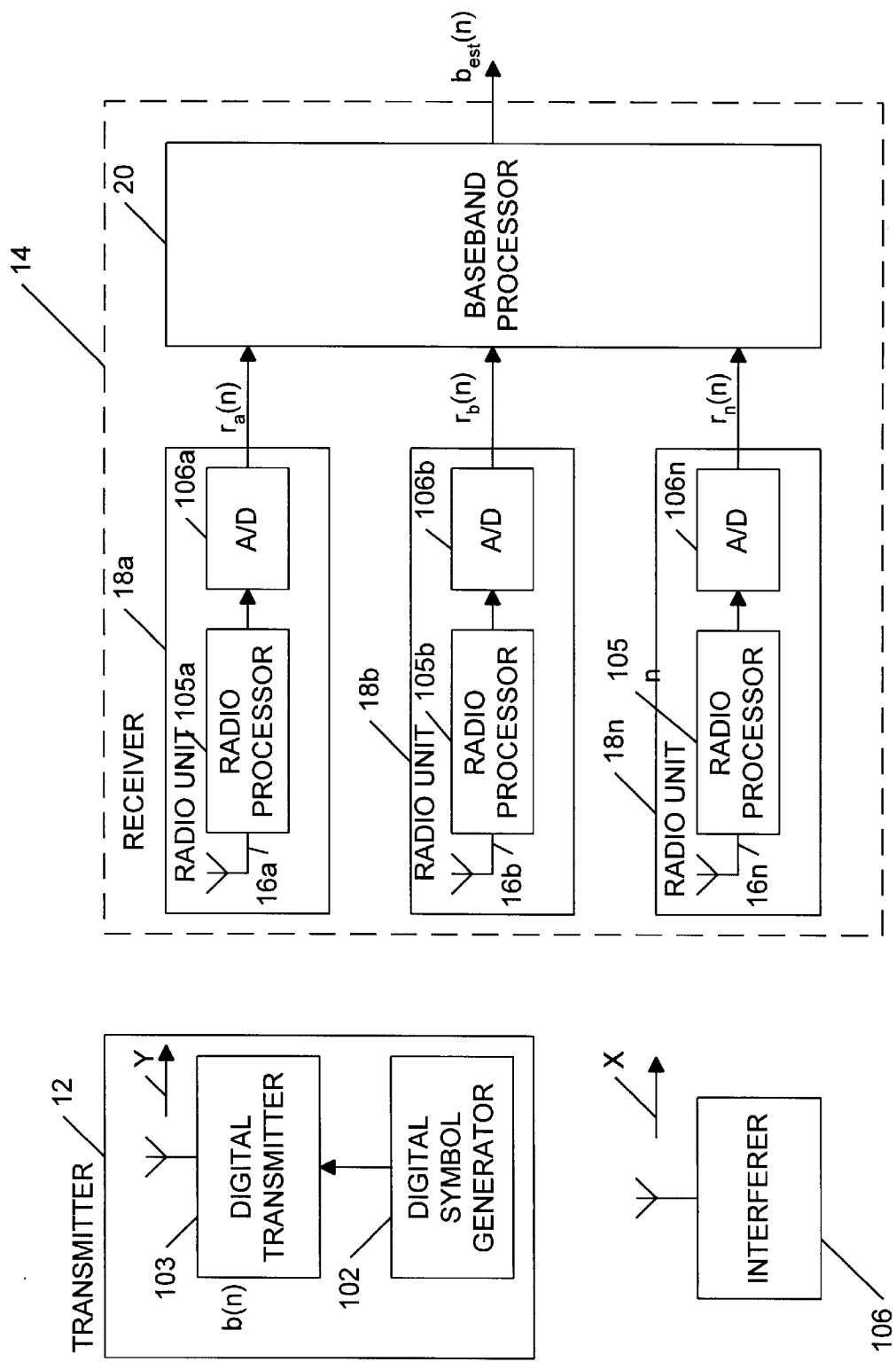
FIG. 1 is a block diagram of a typical digital communication system.

FIG. 1 illustrates a typical digital communication system 10 including a transmitter 12 and a receiver 14. Receiver 14 comprises multiple receiver radio units 18a–18n, each of which has a corresponding antenna 16a–16n, radio processor 105a–105n and analog-to-digital converter 106a–106n.

Transmitter 12 includes a digital symbol generator 102 and a digital transmitter 103. Symbol generator 102 receives an information carrying signal 101 and generates a corresponding digital symbol sequence b(n). The digital symbol sequence b(n) is passed to digital transmitter 103, which subjects the sequence to digital to analog (D/A) conversion, modulation, pulse shaping, amplification, and transmits the resulting analog signal Y.

Each receiver radio unit 18a–18n has an antenna 16a–16n which receives an analog received signal corresponding to the transmitted signal Y and passes the received signal to a radio processor 105a–105n. Antennas 16a–16n are spaced apart from one another. Accordingly, each radio unit 18a–18n receives a received signal from a different receive channel.

In the example described here, the channel is a radio transmission channel. However, those skilled in the art will appreciate that the transmission channel may also be a telephone transmission channel, local area network transmission channel, etc. It may also be a radio channel associated with a phased array antenna element or a beam from a beam former.

Radio processors 105a–105n typically filter, amplify, and mix the received signal. The received signal is then converted by means of analog to digital converters 106a–106n into a stream of complex digital samples $r_x(n)$, where reference numeral n is an integer counter and the subscript x indicates the receive channel corresponding to the sample stream. For example, radio unit 18a receives an analog signal on antenna 16a and generates a corresponding digital sample stream (or signal) $r_a(n)$. The resulting digital signals $r_x(n)$ consist of complex samples having in-phase (I) and quadrature (Q) components. It will be understood by those skilled in the art, however, that the samples do not necessarily have to be complex numbers, and that the invention described herein will be equally applicable in such a case.

Next, the complex samples $r_x(n)$ are provided to a baseband processor 20. Baseband processor 20 processes the complex samples $r_x(n)$ in a conventional manner to detect the information symbols, producing $b_{det}(n)$ from the received sample streams.

Due to the effects of the transmission through the channel, the signals received at the receive antennas 16 include impairment signals which consist of thermal noise and possibly interference signals. An example of an interfering signal is shown on FIG. 1 as signal X generated by interferer 106. The impairment signals make it difficult for the receiver to perfectly recover the information symbols from the received sample streams.

Figure 2:
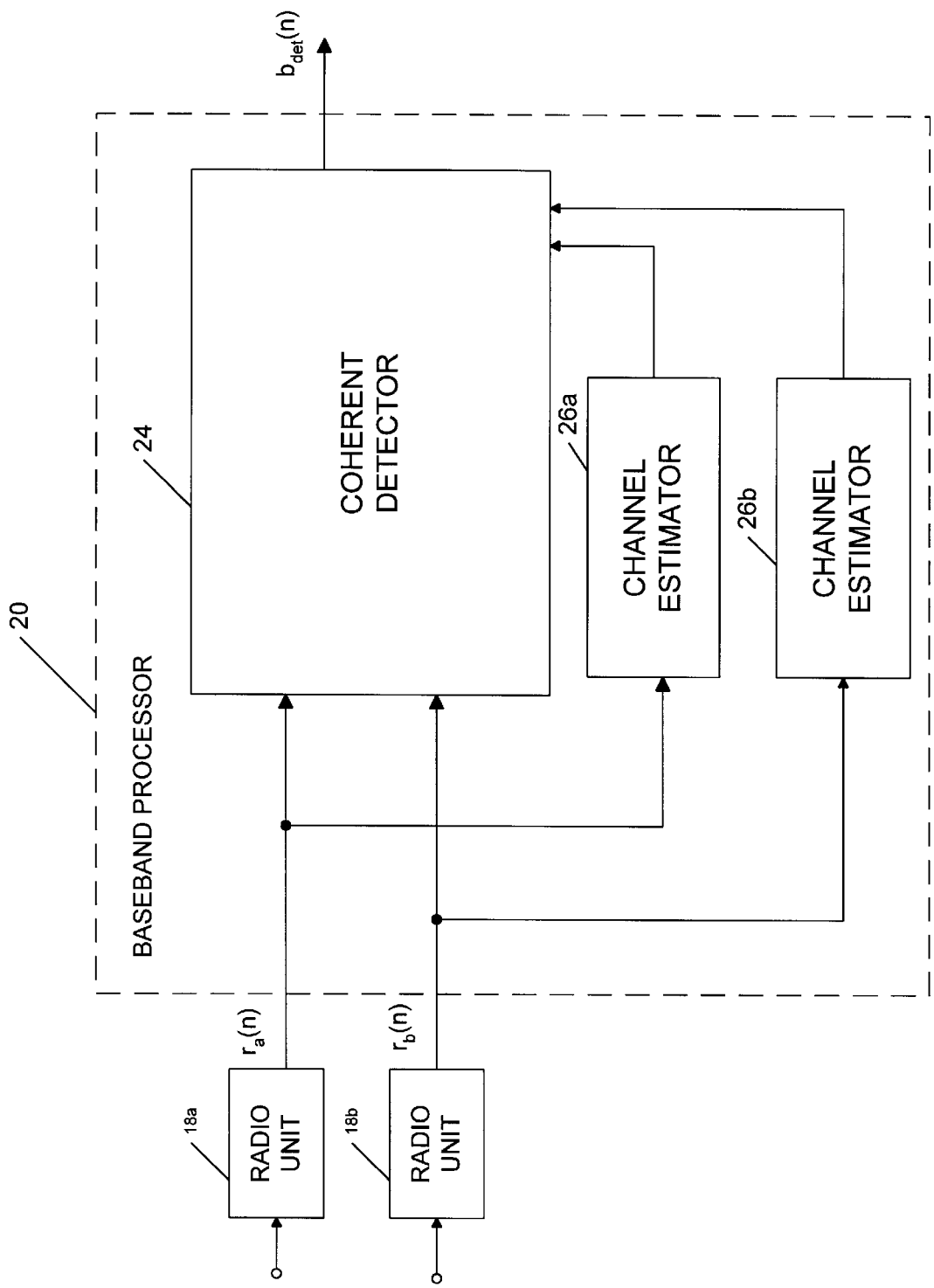
FIG. 2 is a block diagram of a traditional baseband processor.

FIG. 2 illustrates a traditional baseband processor 20 where, for simplicity, the number of radio units coupled to the baseband processor 20 is restricted to two, designated 18a and 18b, creating two receive channels. Baseband processor 20 can be by those skilled in the art adapted to handle an increased number of radio units 18x.

Baseband processor 24 includes coherent detector 24 and channel estimators 26a and 26b. The coherent detector 24 receives the complex sample streams $r_a(n)$ and $r_b(n)$ from the radio units 18a,b. The detector 24 may be implemented by the multi-antenna MLSE equalizer disclosed in U.S. Pat. No. 5,191,598 to Bäckström et al.

Channel estimators 26a,b also receive the complex sample streams. The channel estimators 26a,b use the sample streams to generate a set or vector of K estimated channel tap coefficients c(0) . . . c(K−1) for each receive antenna. In the traditional system, each channel is tracked separately. That is, the channel tap coefficients of each channel are estimated independently, using that channel's corresponding received sample stream, but without reference to the received sample streams received over other channels. The detected values $b_{det}(n)$ may also be used by channel estimators 26a,b to calculate channel tap estimates. However, use of $b_{det}(n)$ by channel estimators 26a,b does not result in the channel's channel tap coefficients being a function of multiple receive sample streams.

The channel tap coefficients are used to model the radio transmission channel associated with each receive antenna. Initial channel tap estimates can be obtained from sync correlation values or least-squares estimation using known techniques. Channel tap estimation, or channel tracking, is well known in the art and is discussed, for example, in J. Proakis, *Digital Communications,* 2d Ed., McGraw-Hill Book Co. 1989, at pp. 624–27.

The channel tap coefficients c(0) . . . c(K−1) for each channel are provided to the detector 24 which detects the information symbols using the complex samples and the channel tap coefficients. The detected symbols may be further processed by the receiver. For example, forward error correction decoding may be performed on the detected symbols.

Figure 3:
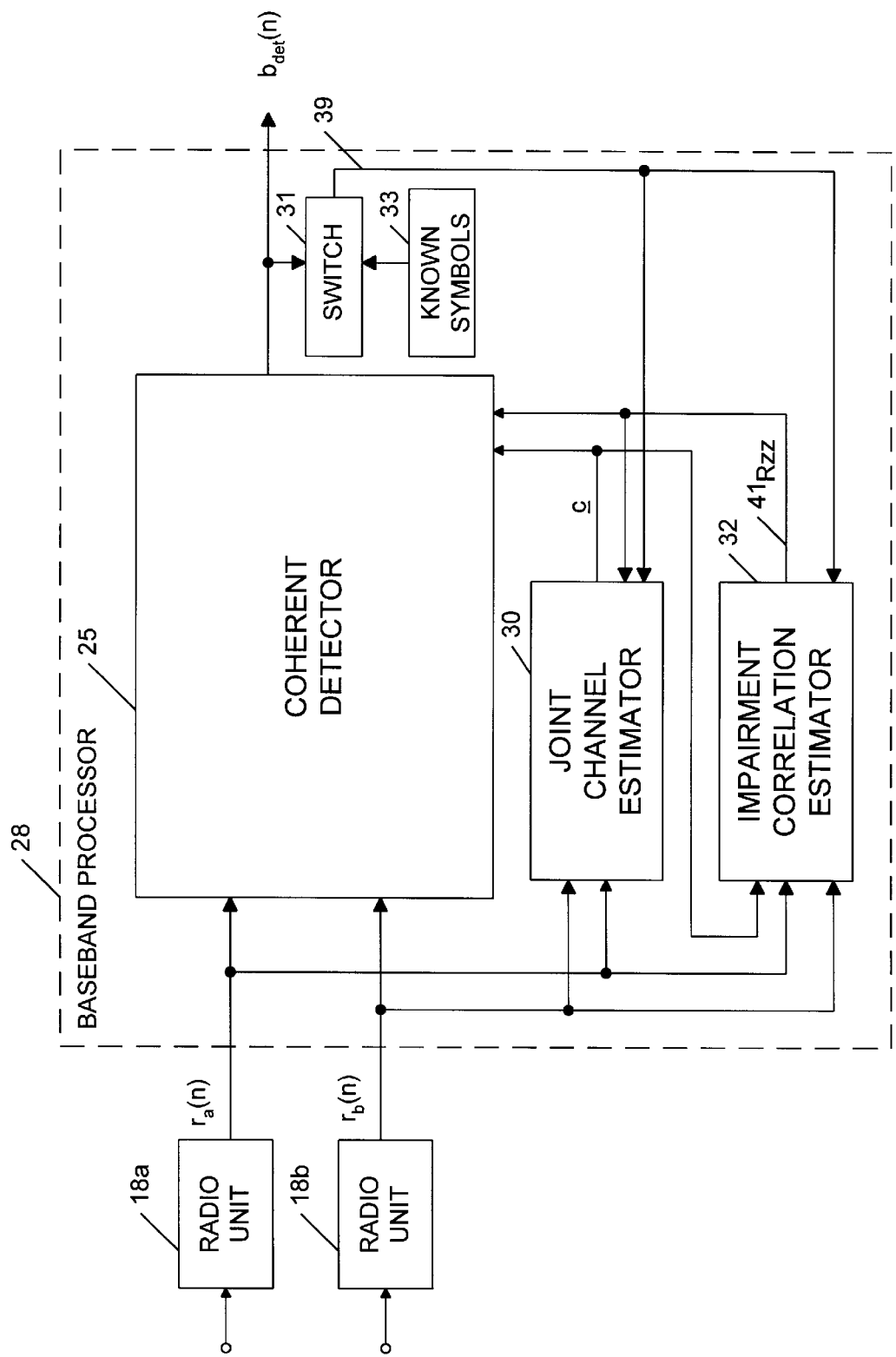
FIG. 3 is a block diagram of a baseband processor according to a preferred embodiment of the present invention.

FIG. 3 illustrates a baseband processor 28 according to a preferred embodiment of the present invention. Baseband processor 28 may be implemented in a Digital Signal Processor (DSP) such as TMS320C50 manufactured by Texas Instruments.

Baseband processor 28 contains a coherent detector 25, a joint channel estimator 30 and an impairment correlation estimator 32.

The joint channel estimator 30 receives the complex sample streams $r_a(n)$ and $r_b(n)$ and the impairment correlation matrix $R_{zz}$ (described below), and estimates a set of channel tap coefficients c(k) (represented as vector c) for each of the receive channels. By using the impairment correlation matrix and calculating the channel tap coefficients as a function of multiple complex sample streams, the impact of interference on the channel tap coefficient estimates is reduced, as described in detail below.

The joint channel estimator 30 also accepts as input known or tentatively detected values of $b_{det}(n)$, which are used by the joint channel estimator 30 to generate channel tap coefficient estimates. Although the value of $b_{det}(n)$ is affected by each of the receive sample streams, the channel tap coefficients generated by the joint channel estimator 30 are considered to be a function of the receive sample streams, as the term "function" is used herein, because the joint channel estimator 30 accepts the receive sample streams as inputs, and not because it accepts $b_{det}(n)$ as an input. In the present invention, the joint channel estimator 30 receives the receive sample streams $r_x(n)$ as inputs and uses these sample streams in generating the channel tap coefficients for each channel such that the channel tap coefficients are functions of multiple sample streams.

The receive sample streams $r_x(n)$ and the channel tap coefficients c(k) are provided to an impairment correlation estimator 32 which generates the impairment correlation matrix $R_{zz}$ for the receive antennas. The impairment correlation estimator 32 can be implemented in a variety of ways, including a method disclosed in U.S. Pat. No. 5,680,459, filed on 2 Aug. 1994, which is incorporated herein by reference. The impairment correlation matrix $R_{zz}$ is provided to joint channel estimator 30 and coherent detector 24 via line 41.

According to a preferred method, channel tap coefficient estimates and known or tentatively detected information symbol values are used to form expected received samples. These expected receive samples are subtracted from the actual received samples to form error samples which are used to estimate an impairment correlation matrix or a related quantity such as its inverse or its adjoint.

A switch 31 provides either known symbol values or tentatively detected information symbol values $b_{det}(n)$ to joint channel estimator 30 and impairment correlation estimator 32 via line 39. Known symbol values may be provided during synchronization processing, during which a known pattern of synchronization symbols is received and processed by the receiver. Following synchronization processing, the switch provides detected information symbol values $b_{det}(n)$ to joint channel estimator 30 and impairment correlation estimator 32.

A coherent detector 25 receives the complex samples, the channel tap coefficients and the impairment correlation information for multiple receive channels and uses them to detect the transmitted information symbols. In the embodiment shown, the coherent detector 25 is adapted to perform interference cancellation. The coherent detector 25 uses the impairment correlation matrix $R_{zz}$ provided by impairment correlation estimator 32 to cancel or reject interference from the complex samples. An example of a suitable detector is described in U.S. Pat. No. 5,680,419. Another example of such a detector is described in J. H. Winters, *Signal Acquisition and Tracking with Adaptive Arrays in the Digital Mobile Radio System IS-54 with Flat Fading,* IEEE Trans. Veh. Technol., Vol. 42, November 1993.

Figure 4:
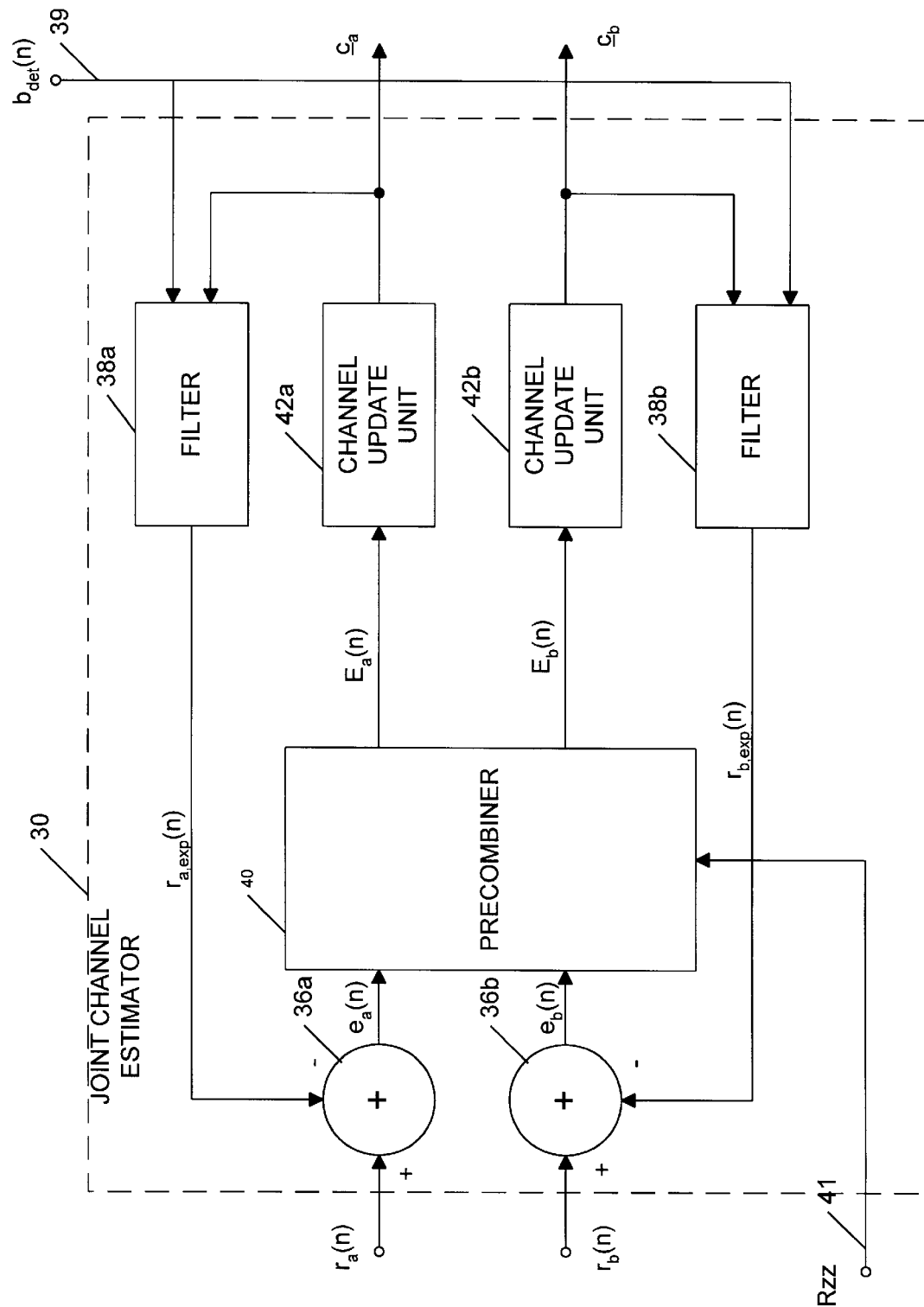
FIG. 4 is a block diagram of a joint channel estimator according to a preferred embodiment of the present invention.

FIG. 4 illustrates a specific embodiment of joint channel estimator 30 coupled to a radio unit 18a and a radio unit 18b. Adders 36a and 36b are connected to radio unit 18a and radio unit 18b, respectively. Adders 36a and 36b receive the complex samples $r_a(n)$ and $r_b(n)$ from radio units 18a and 18b, respectively. Expected complex samples $r_{a,exp}(n)$ and $r_{b,exp}(n)$ are provided by a plurality of filters 38a,b, and are subtracted from the complex samples at each adders 36a and 36b generating initial error samples $e_x(n)$ for each receive antenna. A precombiner 40, connected to adders 36a and 36b, receives the initial error samples generated by the adders 36a,b. In a method described below, the precombiner 40 forms linear combinations of the initial error samples and generates refined error samples $E_a(n)$ and $E_b(n)$ that have reduced interference by using the impairment correlation matrix estimate $R_{zz}$ generated by impairment correlation estimator 32. Next, the refined error samples $E_a(n)$ and $E_b(n)$ are provided to a plurality of channel update units 42a,b which use any of a variety of standard channel tracking algorithms, such as the Least Mean Square (LMS) algorithm, to generate channel tap coefficients. The filters 38a,b, each being connected to one of the channel update units 42a,b, receive the channel tap coefficients. The filters 38a,b use the channel tap coefficients to process known or tentatively detected information symbol values to generate the expected receive samples $r_{x,exp}(n)$ according to the following equation:

$$r_{x,exp}(n) = c_x(0)b_{det}(n) + \ldots + c_x(K-1)b_{det}(n-K+1) \qquad [5]$$

Known values of b(n) would be used during synchronization processing, for example, when a predetermined synchronization signal is processed by the receiver.

Furthermore, the desired signal component of the received signal can comprise several signals of interest. For example, the desired signal may include several information streams intended for the receiver. Also, it may include a subset of interfering signals, such as the strongest interferer. The impairment is then any remaining signals as well as any thermal noise present. Finally, the baseband processor may employ multiple channel models using per survivor processing methods. An example thereof is disclosed in U.S. Pat. No. 5,164,961 to Gudmundson. The present invention can be easily applied thereto.

The following two-antenna example illustrates the operation of the present invention: Let $r_x(n)$ denote the complex samples received by the adder $36_x$ from a radio unit 18x. Using channel tap coefficient estimates $c_x(k)$ and known or detected symbol values $b_{det}(n)$, expected complex receive samples $r_{x,exp}(n)$ can be generated in filters 38 as follows:

$$r_{a,exp}(n) = c_a(0)b_{det}(n) + \ldots + c_a(K-1)b_{det}(n-K+1) \qquad [6a]$$

$$r_{b,exp}(n) = c_b(0)b_{det}(n) + \ldots + c_b(K-1)b_{det}(n-K+1) \qquad [6b]$$

The adders 36a,b receive the complex samples and the expected values of the complex samples, and generate the initial error samples $e_x(n)$ as follows:

$$e_a(n) = r_a(n) - r_{a,exp}(n) \qquad [7a]$$

$$e_b(n) = r_b(n) - r_{b,exp}(n) \qquad [7b]$$

Next, the precombiner 40 receives the first error samples and forms linear combinations of the first error samples to generate the refined error samples $E_x(n)$ as follows:

$$E_a(n) = Ge_a(n) - Ke_b(n) \qquad [8a]$$

$$E_b(n) = He_b(n) - Le_a(n) \qquad [8b]$$

where subscripts a and b refer to specific antennas and the values for G, H, K and L are based on impairment correlation values provided by the impairment correlation estimator 32. For this example, it is best to use G=1, H=1, and the values for K and L as follows:

$$K = \frac{E[z_a(n)z_b^*(n)]}{E[z_b(n)z_b^*(n)]} \qquad [9a]$$

$$L = \frac{E[z_b(n)z_a^*(n)]}{E[z_a(n)z_a^*(n)]} \qquad [9b]$$

where E[x] denotes the expected value of x. Each expected value represents an estimate of a correlation between the two quantities in the expected value. One way to estimate correlation between impairment values is to average products of $e_x(n)$ values.

To show that the interference is canceled, the invention is analyzed for the case of a one channel tap model, although the invention works for multiple channel tap models as well. The complex samples are modeled as:

$$r_a(n) = c_a(0)b(n) + z_a(n) \qquad [10a]$$

$$r_b(n) = c_b(0)b(n) + z_b(n) \qquad [10b]$$

where the impairment values $z_a(n)$ and $z_b(n)$, are assumed to result from a single interferer, so that they consist of interference channel tap coefficients $d_x(0)$ times interference symbol values i(n), so that $$z_a(n) = d_a(0)i(n) \qquad [11a]$$

$$z_b(n) = d_b(0)i(n) \qquad [11b]$$

After subtracting the expected received signal value from the actual received signal value, the first error samples are given by $$e_a(n) = z_a(n) + t_a(n) = d_a(0)i(n) + t_a(n) \qquad [12a]$$

$$e_b(n) = z_b(n) + t_b(n) = d_b(0)i(n) + t_b(n) \qquad [12b]$$

where $t_x(n)$ is the tracking error term due to imperfect channel estimation for the desired signal. Assuming that $|i(n)|=1$, then the values for K and L become:

$$K = \frac{d_a(0)d_b^*(0)}{d_b(0)d_b^*(0)} = \frac{d_a(0)}{d_b(0)} \qquad [13a]$$

$$L = \frac{d_b(0)d_a^*(0)}{d_a(0)d_a^*(0)} = \frac{d_b(0)}{d_a(0)} \qquad [13b]$$

Using these values for K and L, the second error sample for antenna a becomes:

$$\begin{aligned} E_a(n) &= e_a(n) - Ke_b(n) \\ &= d_a(n)i(n) + t_a(n) - K(d_b(n)I(n) + t_b(n)) \\ &= d_a(n)i(n) + t_a(n) - d_a(n)i(n) - Kt_b(n) \\ &= t_a(n) - Kt_b(n) \end{aligned}$$

A similar result can be shown for $E_b(n)$. Observe that the interference has been removed, but the term related to the tracking error on the other antenna has been added. If the interference is much stronger than the tracking error, then this trade-off is justified.

From equations 8a and 8b, the operation of precombiner 40 may be expressed as follows:

$$E_a(n) = e_a(n) - \frac{d_a(0)}{d_b(0)} e_b(n) \qquad [15a]$$

$$E_b(n) = e_b(n) - \frac{d_b(0)}{d_a(0)} e_b(n) \quad [15b]$$

Collecting quantities into vectors, the second error samples may be expressed as follows:

$$\overline{E}(n) = W(n)\overline{e}(n) \quad [16]$$

where:

$$W(n) = \begin{bmatrix} 1 & -K \\ -L & 1 \end{bmatrix} \quad [17]$$

From equations 13a and 13b, it is apparent that W(n) may be expressed in terms of $d_a(0)$ and $d_b(0)$ as follows:

$$W(n) = \begin{bmatrix} 1 & \frac{-d_a(0)d_b^*(0)}{|d_b(0)|^2} \\ \frac{-d_b(0)d_a^*(0)}{|d_a(0)|^2} & 1 \end{bmatrix} \quad [18]$$

Thus, the error signals are precombined to cancel interference. The precombining matrix W(n) is expressed in terms of interference channel taps $d_x(0)$, which are related to the impairment correlation matrix as follows:

$$R_{zz}(n) = \begin{bmatrix} |d_a(0)|^2 & d_a(0)d_b^*(0) \\ d_b(0)d_a^*(0) & |d_b(0)|^2 \end{bmatrix} \quad [19]$$

where $R_{zz}(n) = E(zz^H)$ is the impairment correlation matrix. Observe that quantities in the impairment correlation matrix $R_{zz}(n)$ can be used to form the precombining matrix W(n).

An estimate of the impairment correlation matrix $R_{zz}(n)$ is generated by the impairment correlation estimator 32. Thus, the precombining matrix W(n) can be generated from the output of the impairment correlation estimator 32. In this manner, the impairment correlation matrix estimate is used to cancel interference present in the inputs to the joint channel estimator 30a.

Other strategies for selecting G, H, K and L are possible. A strategy that balances interference cancellation with tracking error introduction is to use the following values for G, H, K and L:

$$G = \frac{1}{\Delta}(F + R_{aa})(F + R_{bb}) \quad [20]$$

$$K = \frac{1}{\Delta}(F + R_{aa})R_{ab} \quad [21]$$

$$H = G \quad [22]$$

$$L = \frac{1}{\Delta}(F + R_{bb})R_{ba} \quad [23]$$

where:

$$\Delta = (F + R_{aa})(F + R_{bb}) - F'R_{ab}R_{ba} \quad [24]$$

As above, $R_{xy} = E[z_x(n)z_y^*(n)]$. F and F' are selected parameters which are dependent upon the operating point of the system. The parameters F and F' may be selected adaptively. For example, they may depend on the rate of change of the impairment correlation estimate. In a mobile radio environment they may depend on an estimate of the vehicle speed of the desired signal. They may also depend on how dispersive the desired signal is.

Note that when F=F'=0, $$\Delta = R_{aa}R_{bb}, \quad [25]$$
$$G = H = 1, \quad [26]$$

$$K = \frac{R_{ab}}{R_{bb}}, \text{ and} \quad [27]$$

$$L = \frac{R_{ba}}{R_{aa}}, \quad [28]$$

which corresponds to the example given above in Equations 9a and 9b.

Figure 5:
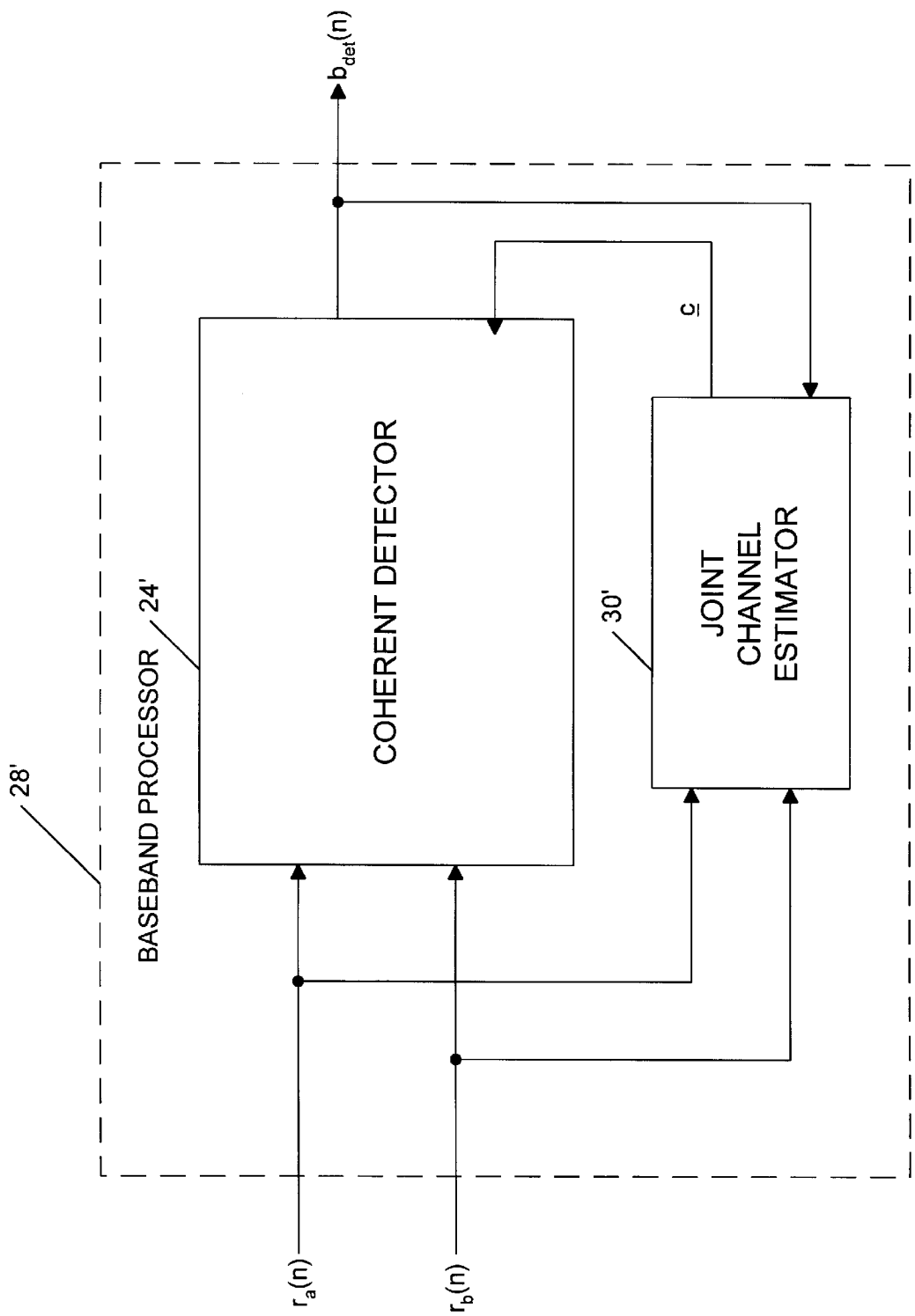
FIG. 5 is a block diagram of a baseband processor according to another embodiment of the present invention.
Figure 6:
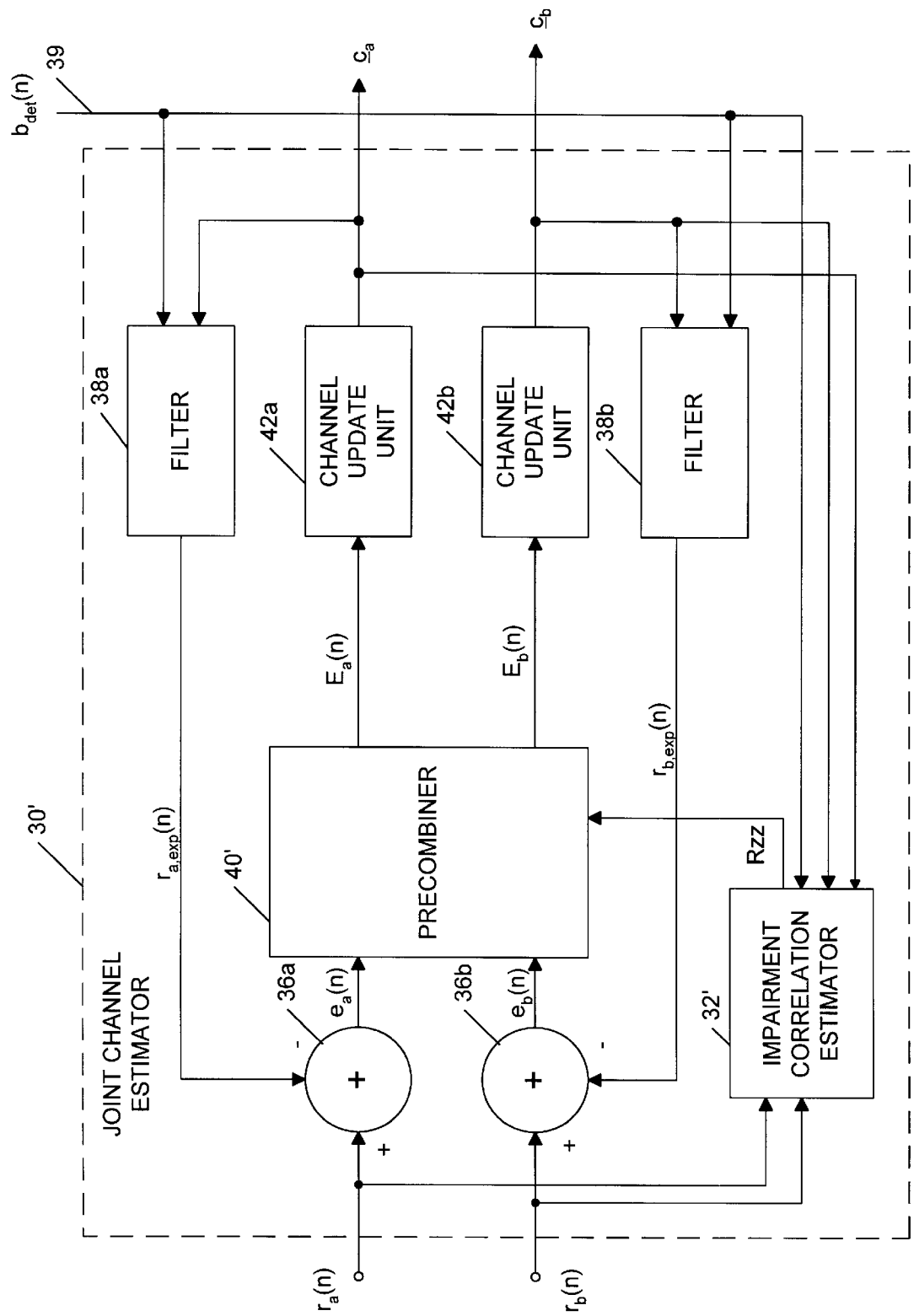
FIG. 6 is a block diagram of a joint channel estimator according to another embodiment of the present invention.

FIGS. 5 and 6 show an embodiment of the present invention in which interference cancellation is not performed by the detector. FIG. 5 shows a baseband processor 28' having a coherent detector 24' and a joint channel estimator 30' which each receive the receive sample streams $r_a(n)$ and $r_b(n)$. Since the coherent detector 24' does not perform interference cancellation, the baseband processor 28' does not have a separate impairment correlation estimator. The joint channel estimator 30b may generate an impairment correlation estimate for use in the precombining operation. In the embodiment shown in FIG. 6, the joint channel estimator 30' includes an impairment correlation estimator 32' which provides an estimate of the impairment correlation matrix $R_{zz}$ to the precombiner 40'.

The joint channel estimator 30 can also be implemented in other ways, for instance, by a Kalman filter. In the Kalman filter formulation, the impairment corresponds to a complex measurement noise which is a standard component of the Kalman filter model. The use of a measurement noise correlation matrix within a Kalman filter is well known to those skilled in the art. Thus, an estimate of the impairment correlation matrix can be used with a Kalman filter to jointly estimate the channel taps.

Figure 7:
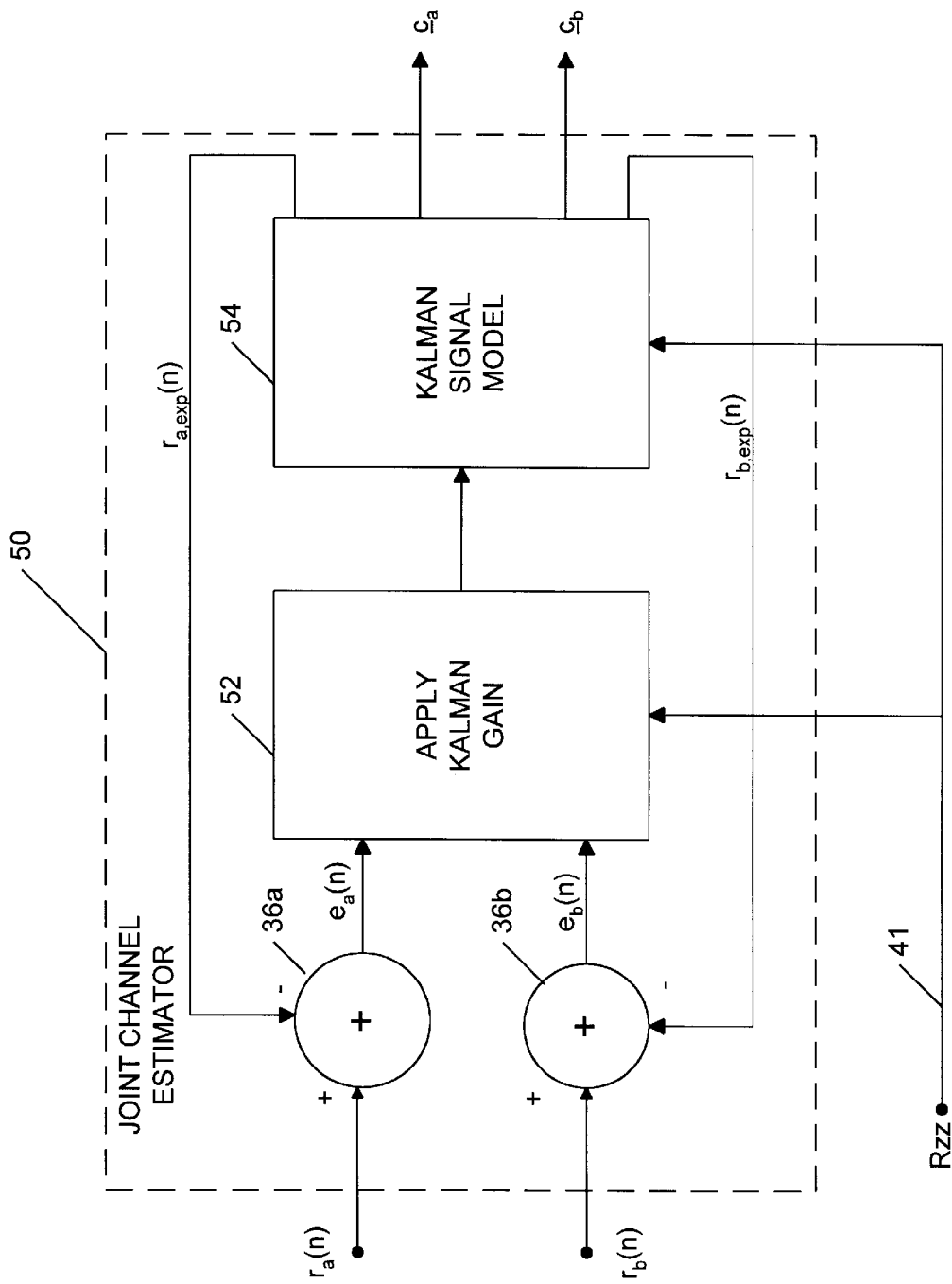
FIG. 7 is a block diagram of a joint channel estimator according to an alternate embodiment of the present invention.

FIG. 7 shows an example of the implementation of the joint channel estimator by a Kalman filter in a two-channel system. The input signals $r_a(n)$, $r_b(n)$ are provided to the joint channel estimator 30b for processing. The Kalman Signal Model 54 provides expected values $r_{a,exp}(n)$ and $r_{b,exp}(n)$, which are subtracted from the input signals at adders 56a, 56b to form error signals $e_a(n)$, $e_b(n)$. The Kalman gain is applied to the estimated error signals, and the results of Kalman gain processing are provided to the Kalman Signal Model 54, which generates a set of channel tap estimates for the system. The operation of the Kalman filter is described in detail in Chapter 3 of B. Anderson and J. Moore, Optimal Filtering, Prentice Hall (1979).

In another embodiment, the present invention may be used to provide improved channel tap estimates for channel analysis, in which no symbol detection is performed. For example, the present invention may be used for the purpose of "channel sounding" or "echo sounding." FIG. 8 shows an example of a channel sounding device 60. Received sample streams $r_a(n)$ and $r_b(n)$ and impairment correlation estimates are provided to a joint channel estimator 30 of the present invention, which outputs a set of channel tap estimates which can be used to model the channels for testing, channel analysis, or other purposes.

Although the previous examples are fairly simple, the present invention can be applied to more sophisticated communication systems. For example, it can be used in a direct-sequence CDMA system to improve estimation of Rake tap coefficients. It can also be used in systems without equalizers or Rake receivers. For coherent detection, a single channel tap coefficient per receive channel can be estimated using the present invention. The present invention can also be used in conjunction with more sophisticated channel estimation techniques such as per survivor processing techniques.

While the present invention has been described with respect to its preferred embodiment, those skilled in the art will recognize that the present invention is not limited to the specific embodiment described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. While the present invention has been described herein in detail in relation to its preferred embodiment, it is also understood that this disclosure is only illustrative and exemplary of the present invention and is made merely for purpose of providing a full and enabling disclosure of the invention. Accordingly, it is intended that the invention be limited only by the spirit and scope of the claims appended hereto.

What is claimed is:

1. An apparatus for estimating channel tap coefficients for a first receive channel, comprising:
    first receiving means for receiving a first received sample stream corresponding to the first receive channel;
    second receiving means for receiving a second received sample stream corresponding to a second receive channel; and
    means for generating a set of estimated channel tap coefficients for the first receive channel as a function of the first received sample stream and the second received sample stream, wherein said means for generating channel tap coefficients includes:
        first means for generating a first initial error sample stream corresponding to the first received sample stream;
        second means for generating a second initial error sample stream corresponding to the second received sample stream; and
        means for producing a first refined error sample stream corresponding to the first receive channel as a function of the first initial error sample stream and the second initial error sample stream.

2. The apparatus of claim 1, wherein said means for generating channel tap coefficients further includes:
    a first filter for generating a first expected received sample stream corresponding to the first receive channel as a function of information symbol values;
    a second filter for generating a second expected received sample stream corresponding to the second receive channel as a function of information symbol values;
    a first adder, coupled to said first filter and said first receiving means, for generating the first initial error sample stream as a function of the first expected received sample stream and the first received sample stream; and
    a second adder, coupled to said second filter and said second receiving means, for generating the second initial error sample stream as a function of the second expected received sample stream and the second received sample stream.

3. The apparatus of claim 1, wherein said producing means produces the first refined error sample stream by forming a linear combination including the first initial error sample stream and the second initial error sample stream.

4. The apparatus of claim 1, wherein said means for generating channel tap coefficients further includes a channel update unit for generating a first set of channel tap coefficients corresponding to the first receive channel as a function of the first refined error sample stream.

5. The apparatus of claim 1, wherein said means for generating channel tap coefficients further includes an impairment correlation estimator for generating an impairment correlation matrix, said impairment correlation matrix having at least two inputs and an output, wherein said at least two inputs are coupled respectively to said first and second receiving means and said output is connected to said producing means.

6. The apparatus of claim 5, wherein said producing means produces the first refined error sample stream by forming a linear combination including the impairment correlation matrix.

7. The apparatus of claim 1, wherein said means for generating channel tap coefficients comprises a Kalman filter.

8. A baseband processor for processing signals received over a first receive channel and a second receive channel, comprising:
    first receiving means for receiving a first received sample stream corresponding to the first receive channel;
    second receiving means for receiving a second received sample stream corresponding to the second receive channel;
    means for generating a set of estimated channel tap coefficients for at least one of the receive channels as a function of the first received sample stream and the second received sample stream; and
    a coherent detector coupled to said first and second sample stream receiving means and said means for generating channel tap coefficients, wherein said means for generating channel tap coefficients includes:
        first means for generating a first initial error sample stream corresponding to the first received sample stream;
        second means for generating a second initial error sample stream corresponding to the second received sample stream; and
        means for producing a first refined error sample stream corresponding to the first receive channel as a function of the first initial error sample stream and the second initial error sample stream.

9. The baseband processor of claim 8, wherein said means for generating channel tap coefficients further includes:
    a first filter for generating a first expected received sample stream corresponding to the first receive channel as a function of information symbol values;
    a second filter for generating a second expected received sample stream corresponding to the second receive channel as a function of information symbol values;
    a first adder, coupled to said first filter and said first receiving means, for generating the first initial error sample stream as a function of the first expected received sample stream and the first received sample stream; and
    a second adder, coupled to said second filter and said second receiving means, for generating the second initial error sample stream as a function of the second expected received sample stream and the second received sample stream.

10. The baseband processor of claim 8, wherein said producing means produces the first refined error sample stream by forming a linear combination including the first initial error sample stream and the second initial error sample stream.

11. The baseband processor of claim 8, wherein said means for generating channel tap coefficients includes a channel update unit for generating a first set of channel tap coefficients corresponding to the first receive channel as a function of the first refined error sample stream.

12. The baseband processor of claim 8, further including an impairment correlation estimator for generating an impairment correlation matrix, said impairment correlation matrix having at least two inputs and an output, wherein said at least two inputs are coupled respectively to said first and second receiving means and said output is connected to said producing means and said coherent detector.

13. The baseband processor of claim 12, wherein the producing means produces the first refined error sample stream by forming a linear combination including the impairment correlation matrix.

14. The baseband processor of claim 8, wherein said means for generating channel tap coefficients comprises a Kalman filter.

15. A radio receiver having a first receive channel and a second receive channel comprising:
 a first radio unit which outputs a first received sample stream corresponding to the first receive channel;
 a second radio unit which outputs a second received sample stream corresponding to the second receive channel;
 means for generating a set of estimated channel tap coefficients for at least one of the receive channels as a function of the first received sample stream and the second received sample stream; and
 a coherent detector coupled to said first and second radio units and said means for generating channel tap coefficients, wherein said means for generating channel tap coefficients includes:
  first means for generating a first initial error sample stream corresponding to the first received sample stream;
  second means for generating a second initial error sample stream corresponding to the second received sample stream; and
  means for producing a first refined error sample stream corresponding to the first receive channel as a function of the first initial error sample stream and the second initial error sample stream.

16. The receiver of claim 15, wherein said means for generating channel tap coefficients includes:
 a first filter for generating a first expected received sample stream corresponding to the first receive channel as a function of information symbol values;
 a second filter for generating a second expected received sample stream corresponding to the second receive channel as a function of information symbol values;
 a first adder, coupled to said first filter and said first radio unit, for generating the first initial error sample stream as a function of the first expected received sample stream and the first received sample stream; and
 a second adder, coupled to said second filter and said second radio unit, for generating the second initial error sample stream as a function of the second expected received sample stream and the second received sample stream.

17. The receiver of claim 15, wherein said producing means produces the first refined error sample stream by forming a linear combination including the first initial error sample stream and the second initial error sample stream.

18. The receiver of claim 15, wherein said means for generating channel tap coefficients includes a channel update unit for generating a first set of channel tap coefficients corresponding to the first receive channel as a function of the first refined error sample stream.

19. The receiver of claim 15, further including an impairment correlation estimator for generating an impairment correlation matrix, said impairment correlation matrix having at least two inputs and an output, wherein said at least two inputs are coupled respectively to said first and second receiving means and said output is connected to said producing means and said coherent detector.

20. The receiver of claim 19, wherein the producing means produces the first refined error sample stream by forming a linear combination including the impairment correlation matrix.

21. The receiver of claim 15, wherein said means for generating a set of estimated channel tap coefficients comprises a Kalman filter.

22. A channel sounding device having a first receive channel and a second receive channel, comprising:
 first receiving means for receiving a first received sample stream corresponding to the first receive channel;
 second receiving means for receiving a second received sample stream corresponding to the second receive channel;
 means for generating a set of estimated channel tap coefficients for at least one of the receive channels as a function of the first received sample stream and the second received sample stream, wherein said means for generating channel tap coefficients includes:
  first means for generating a first initial error sample stream corresponding to the first received sample stream;
  second means for generating a second initial error sample stream corresponding to the second received sample stream; and
  means for producing a first refined error sample stream corresponding to the first receive channel as a function of the first initial error sample stream and the second initial error sample stream.

23. The channel sounding device of claim 22, wherein said means for generating channel tap coefficients further includes:
 a first filter for generating a first expected received sample stream corresponding to the first receive channel as a function of information symbol values;
 a second filter for generating a second expected received sample stream corresponding to the second receive channel as a function of information symbol values;
 a first adder, coupled to said first filter and said first receiving means, for generating the first initial error sample stream as a function of the first expected received sample stream and the first received sample stream; and
 a second adder, coupled to said second filter and said second receiving means, for generating the second initial error sample stream as a function of the second expected received sample stream and the second received sample stream.

24. The channel sounding device of claim 22, wherein said producing means produces the first refined error sample stream by forming a linear combination including the first initial error sample stream and the second initial error sample stream.

25. The channel sounding device of claim 22, wherein said means for generating channel tap coefficients includes a channel update unit for generating a first set of channel tap coefficients corresponding to the first receive channel as a function of the first refined error sample stream.

26. The channel sounding device of claim 22, further including an impairment correlation estimator for generating an impairment correlation matrix, said impairment correlation matrix having at least two inputs and an output, wherein said at least two inputs are coupled respectively to said first and second receiving means and said output is connected to said producing means.

27. The channel sounding device of claim 26, wherein the producing means produces the first refined error sample stream by forming a linear combination including the impairment correlation matrix.

28. The channel sounding device of claim 27, wherein said means for generating a set of estimated channel tap coefficients comprises a Kalman filter.

29. A radio receiver having a plurality of receive channels, comprising:
   a plurality of radio units, each of said radio units corresponding to one of the plurality of receive channels and comprising means for generating a digital sample stream corresponding to one of said plurality of receive channels; and
   a joint channel estimator for generating a set of estimated channel tap coefficients for each of said plurality of receive channels wherein at least one set of estimated channel tap coefficients is dependent upon at least two of said plurality of digital sample streams wherein said joint channel estimator further comprises:
      a plurality of filters for generating expected values of said digital samples;
      a plurality of adders for receiving the digital samples and expected samples and generating first error samples for each receive channel;
      a precombiner connected to said plurality of adders for receiving the first error samples and generating second error samples for each receive channel; and
      a plurality of channel update units connected to said precombiner for receiving the second error samples generated by said precombiner and for generating estimates of the channel tap coefficients.

30. A radio receiver according to claim 29 wherein said precombiner generates a second error sample for each receive channel by forming linear combinations of said first error samples.

31. A radio receiver according to claim 29 wherein said joint channel estimator comprises a Kalman filter.

32. A method for estimating a set of channel tap coefficients for a receive channel in a system having a plurality of receive channels, comprising the steps of:
   receiving a plurality of communications signals over the plurality of receive channels;
   converting said plurality of communications signals into a plurality of digital sample streams;
   estimating a set of channel tap coefficients for one of said plurality of receive channels, whereby the channel tap coefficient estimates for said one of said plurality of receive channels are dependent upon at least two of said plurality of sample streams, further comprising the steps of:
      generating first error samples for each receive antenna;
      forming linear combinations of the first error samples to generate second error samples for each receive antenna; and
      generating a set of estimated channel tap coefficients for each of said plurality of receive antennas.

33. The method of claim 32, further including the steps of:
   generating a first error sample stream for each receive antenna;
   applying the Kalman gain to said first error sample streams to generate a Kalman gain output; and
   providing the output of the Kalman gain to the Kalman signal model.

* * * * *